(12) United States Patent
Withanawasam

(10) Patent No.: US 7,154,267 B2
(45) Date of Patent: Dec. 26, 2006

(54) METHOD AND SYSTEM FOR ELECTRONIC COMPASS CALIBRATION AND VERIFICATION

(75) Inventor: Lakshman S. Withanawasam, Maple Grove, MN (US)

(73) Assignee: Honeywell International, Inc., Morristown, NJ (US)

(*) Notice: Subject to any disclaimer, the term of this patent is extended or adjusted under 35 U.S.C. 154(b) by 184 days.

(21) Appl. No.: 11/031,940

(22) Filed: Jan. 7, 2005

(65) Prior Publication Data

US 2006/0152217 A1    Jul. 13, 2006

(51) Int. Cl.
*G01R 33/00* (2006.01)
*G01B 7/00* (2006.01)
*G01C 17/02* (2006.01)

(52) U.S. Cl. .................... 324/244; 33/355 R
(58) Field of Classification Search ............... 324/244; 33/355 R
See application file for complete search history.

(56) References Cited

U.S. PATENT DOCUMENTS

| | | | |
|---|---|---|---|
| 5,247,278 A | 9/1993 | Pant et al. ............... 338/32 |
| 5,500,589 A | 3/1996 | Sumcad .................. 324/202 |
| 5,644,225 A | 7/1997 | Alfors et al. ............ 324/202 |
| 5,952,825 A | 9/1999 | Wan ........................ 324/252 |
| 6,173,501 B1 | 1/2001 | Blank et al. .............. 33/356 |
| 6,427,349 B1 | 8/2002 | Blank et al. .............. 33/356 |
| 6,543,146 B1 | 4/2003 | Smith et al. .............. 33/356 |
| 6,661,223 B1 | 12/2003 | Cheng-I Fang et al. .... 324/202 |
| 2003/0023380 A1 | 1/2003 | Woloszyk et al. ......... 701/224 |
| 2003/0042901 A1 | 3/2003 | Witcraft et al. .......... 324/252 |

*Primary Examiner*—Bot LeDynh
(74) *Attorney, Agent, or Firm*—McDonnell Boehnen Hulbert & Berghoff LLP

(57) ABSTRACT

A method and system for calibrating a magnetic compass and/or verifying a compass calibration, using a calibration magnetic field produced by a field-generating coil within the magnetic compass is described. The field-generating coil is located near magnetometers within the magnetic compass. Passing a self-trimming current through the coil produces a magnetic field that acts on the magnetometers. Samples of an output signal from each magnetometer are taken to obtain digital values that indicate the output signal from each magnetometer. The digital values are used by a processor to determine one or more calibration coefficient for using calibrating the magnetic compass. The samples of the output signals are taken when a self-trimming current is passing through the coil and when the self-trimming current is not passing through the coil. Calibration of the compass occurs by applying the one or more calibration coefficients to subsequent signals that indicate the output signals of one or more of the magnetometers.

34 Claims, 9 Drawing Sheets

METHOD AND SYSTEM FOR ELECTRONIC COMPASS CALIBRATION AND VERIFICATION

BACKGROUND

1. Field of Invention

This invention relates generally to electronic compasses and more particularly to a system and method for calibrating a magnetic compass.

2. Description of Related Art

Electronic compasses provide compassing capabilities in a variety of applications such as automobiles, airplanes, boats, and personal handheld devices. Magnetic compasses are one type of electronic compass that provide a means for determining a compass heading. As examples, the compass heading may indicate North or South. Other examples of compass headings are also possible.

A magnetic compass may include two or more magnetometers. A magnetometer is a device capable of sensing a magnetic field or a component of a magnetic field in one or more directions. A magnetic compass may use magnetometers to sense a magnetic field in proximity to the magnetic compass and to determine a compass heading.

A magnetic compass may be calibrated in order to ensure the compass provides an accurate compass heading. One form of compass calibration occurs by (i) using external calibration equipment to apply a magnetic field in close proximity to the compass, and (ii) trimming compass signals produced by the compass in response to how the magnetic field affects the compass signals.

Compass signals are signals produced by a compass and may include, but are not limited to, output signals of the magnetometers. One way to trim compass signals is to adjust the compass components that produce the compass signal. Trimming compass signals may be used to compensate for variation in the compass components that produce the compass signals.

Various entities may calibrate a compass by trimming compass signals. For example, an entity such as a compass manufacturer may trim compass signals during the process of manufacturing a compass, prior to distributing a manufactured compass to its customers. As another example, an entity such as a customer that receives a manufactured compass from a compass manufacturer may trim compass signals prior to integrating the compass with a given device, such as a wireless phone, or after integrating the compass with the given device.

Calibrating a magnetic compass by trimming compass signals could involve applying a magnetic field at the magnetic compass in order to produce a change in the magnetic field acting on the magnetic compass. Applying a magnetic field at the magnetic compass has typically consisted of using a device external to the magnetic compass to create the magnetic field. Devices for generating magnetic fields at magnetic sensors are well known. For example, U.S. Pat. No. 6,661,223 provides that a magnetic field can be generated by several known techniques such as using a Helmholz coil or using a coil wrapped around a ferromagnetic material such as iron.

The need to use calibration equipment external to a magnetic compass during the calibration of a magnetic compass may be a burden to the person/entity calibrating the magnetic compass because of the expense, set up, maintenance, and use, of the calibration equipment. It would thus be useful if a magnetic compass could be calibrated by trimming compass signals without the need to use calibration equipment external to the magnetic compass during the calibration process.

SUMMARY

The present invention overcomes the necessity of using calibration equipment, external to a magnetic compass, to produce a magnetic field for use in calibrating a magnetic compass. The present invention provides a system and method for using components within a magnetic compass to calibrate the magnetic compass by trimming compass signals produced by the magnetic compass.

In one respect, an exemplary embodiment of the invention may take the form of a system that includes (i) a first magnetometer that produces a first magnetometer output signal, (ii) a second magnetometer that produces a second magnetometer output signal, (iii) an analog-to-digital converting means coupled to the first and second magnetometers for converting the first magnetometer output signal to a first digital signal and converting the second magnetometer output signal to a second digital signal, (iv) a processor that receives the first and second digital signals, and (v) a network that includes a field-generating coil located in proximity to the first and second magnetometers. The network is coupled to the processor, which provides a first voltage signal at the network for producing a first self-trimming current. The coil generates a magnetic field in the vicinity of the first and second magnetometers when the first self-trimming current passes through the coil.

In another respect, an exemplary embodiment of the invention could take the form of a magnetic compass that includes (i) first and second magnetometers that produce first and second output signals, respectively, (ii) an amplification means coupled to (a) the first magnetometer for receiving and then amplifying the first output signal to produce a first amplifier signal, and (b) the second magnetometer for receiving and then amplifying the second output signal to produce a second amplifier signal, (iii) an analog-to-digital signal converting means coupled to the amplification means, for receiving and then converting the first amplifier signal to a first digital signal, and for receiving and then converting the second amplifier to a second digital signal, (iv) a processor that receives the first and second digital signals, and (v) a network that includes a field-generating coil located in proximity to the first and second magnetometers. The network is coupled to the processor that provides a voltage signal at the network for producing a first self-trimming current. In this regard, the coil generates a magnetic field in the vicinity of the first and second magnetometers when the first self-trimming current passes through the coil In yet another respect, the exemplary embodiment could take the form of a method of calibrating a magnetic compass that comprises a processor, a field generating coil coupled to the processor, at least first and second magnetometers, and an analog-to-digital signal converting means that converts at least a first analog signal to a first digital signal and a second analog signal to a second digital signal, where the method includes (i) driving the coil with a first voltage supplied by a first processor output so as to supply a first self-trimming current through the coil, (ii) reading values of the the first and second digital signals, at the processor when driving the coil with the first voltage, to obtain a first digital value and a second digital value, respectively, (iii) reading values of the first and second digital signals, at the processor when not driving the coil, to obtain a third digital value and a fourth digital value, respectively, and (iv) determining a first calibration coefficient based on the first digital value, the second digital value, the third digital value, and the fourth digital value, for use in trimming at least one of the first and second digital signals.

These as well as other aspects and advantages of the invention will become apparent to those of ordinary skill in the art by reading the following detailed description, with reference where appropriate to the accompanying drawings. Further, it should be understood that the embodiments noted in this summary are not intended to limit the scope of the invention as claimed.

BRIEF DESCRIPTION OF THE DRAWINGS

Preferred embodiments of the present invention are described with reference to the following drawings, wherein.

DETAILED DESCRIPTION

1. Magnetic Compass Overview

Figure 1:
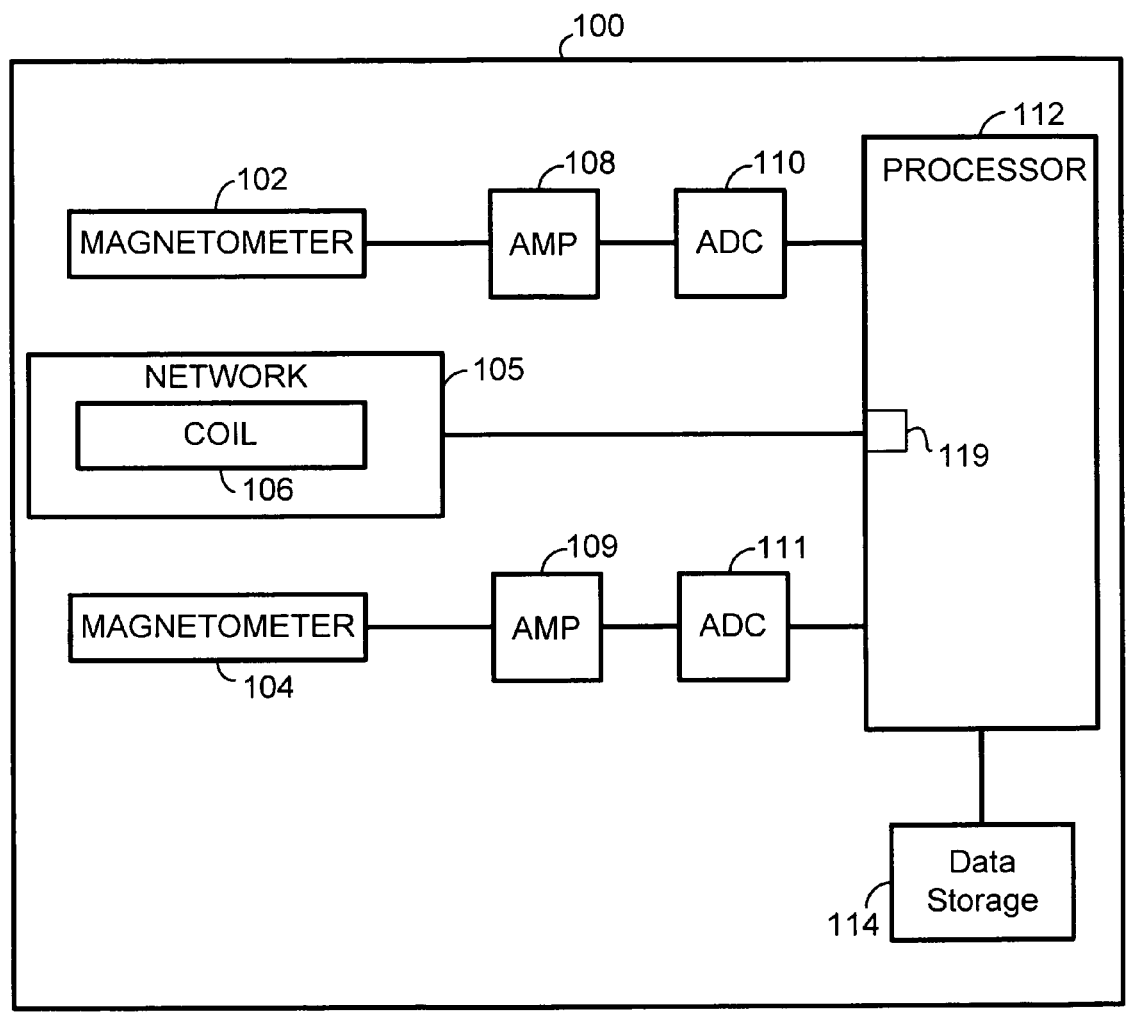
FIG. 1 is a system block diagram of a preferred embodiment of the present invention.

FIG. 1 is a block diagram of a magnetic compass 100 arranged in accordance with a preferred embodiment of the present invention. The magnetic compass 100 includes: (i) magnetometers 102, 104, (ii) a network 105 comprising a coil 106, (iii) amplifiers 108, 109, (iv) analog-to-digital converters 110, 111, (v) a processor 112, and (vi) data storage 114.

Various types of magnetometers are available for use with the present invention. For example, the magnetometers 102, 104 could each be the type of magnetometer that comprises (i) a magnetoresistive magnetic sensor, or (ii) a flux gate magnetic sensor, or (iii) a Hall-effect magnetic sensor, or (iv) some other type of magnetic sensor. Preferably, the same type of magnetometer is used for magnetometer 102 and 104. Although, FIG. 1 only shows two magnetometers, the magnetic compass 100 could include more than two magnetometers.

The magnetometers 102 and 104 sense a magnetic field (i.e. one or more magnetic fields) present at the magnetometers 102 and 104, respectively. As an example, the magnetic fields present at the magnetometers 102 and 104 could include the Earth's magnetic field and a stray magnetic field produced by other sources including the magnetic compass 100. Other examples of the magnetic field are also possible.

In response to sensing the magnetic fields, (i) the magnetometer 102 produces a first magnetometer output signal that indicates the magnetic field present at the magnetometer 102, and (ii) the magnetometer 104 produces a second magnetometer output signal that indicates the magnetic field present at the magnetometer 104.

The first and second magnetometer output signals may each be arranged according to any available format for magnetometer output signals. Preferably, the first and second magnetometer output signals will be arranged according to the same output signal format. As an example, the first and second magnetometer output signals may be arranged as single ended output signals. As another example, the first and second magnetometer output signals may be arranged as differential output signals. Other examples of magnetometer output signal formats are also possible.

Figure 2:
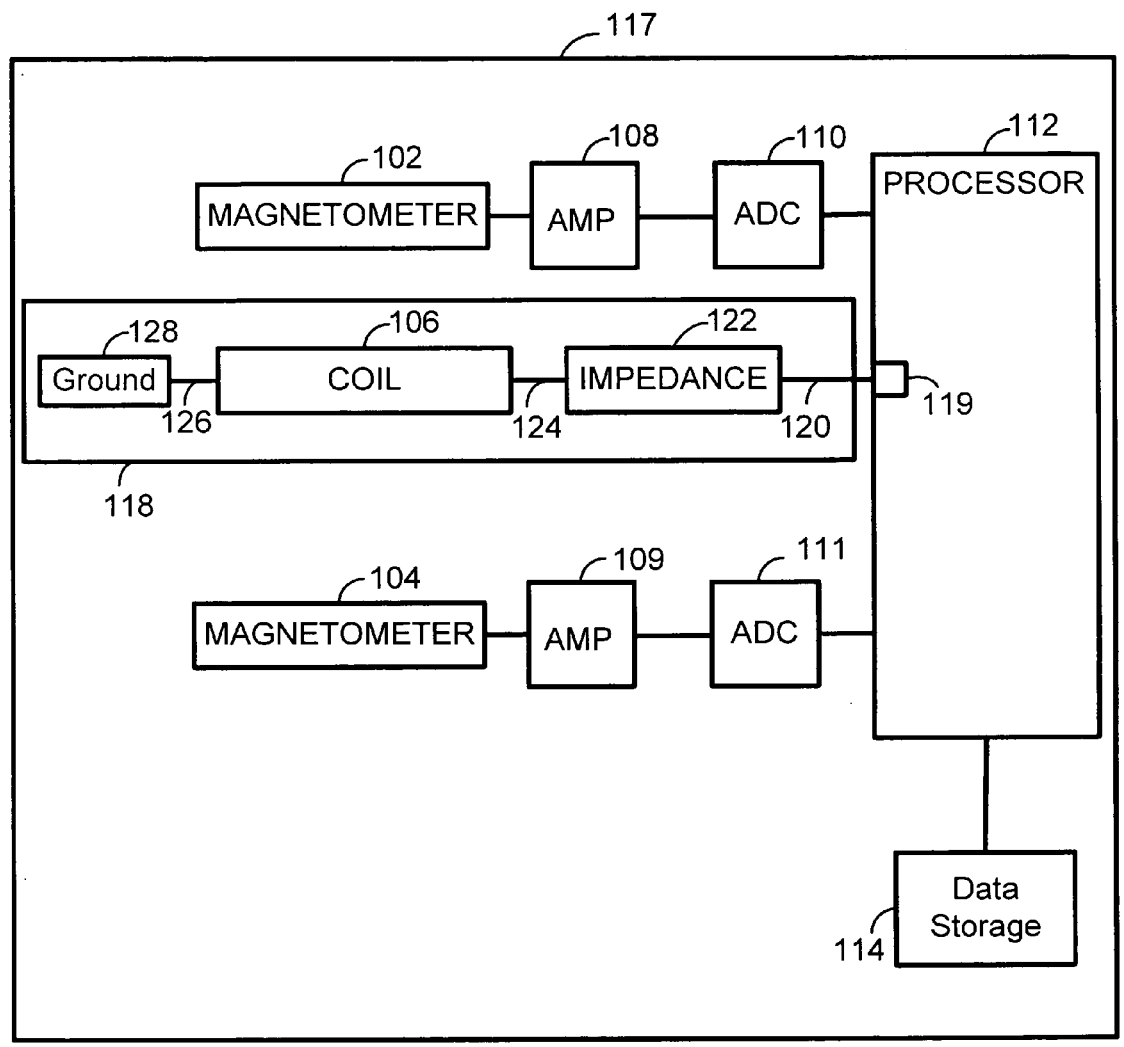
FIG. 2 depicts a preferred embodiment of the present invention as a system that includes a first network embodiment.

The network 105 couples the coil 106 to the processor 112. The network 105 may comprise a variety of components and interconnections. Preferred embodiments of the network 105 are shown in FIG. 2 as network 118, in FIG. 3 as network 131, and in FIG. 4 as network 151.

The magnetometers 102, 104 are located in proximity to the coil 106. The proximity of the coil 106 to the magnetometers 102, 104 should be sufficiently close so that a current passing through the coil 106 will produce a magnetic field that is applied to the magnetometers 102, 104. In this regard, the magnetometers 102, 104 may sense the magnetic field produced by the current passing through the coil 106.

The coil 106 is a field-generating coil and may be arranged in various configurations. For example, the coil 106 may comprise a single coil located in proximity to the magnetometers 102,104. As another example, the coil 106 may comprise a single conductor having (i) a first coil located in proximity to the magnetometer 102, and (ii) a second coil located in proximity to the magnetometer 104. Other examples of coil configurations are also possible.

The magnetometers 102, 104 are coupled to means for amplifying signals within the compass 100. Various amplifier arrangements may be used to amplify signals within the compass 100. As an example, as shown in FIG. 1, magnetometers 102, 104 may be coupled to amplifiers 108, 109 respectively. In this regard, (i) amplifier 108 receives and responsively amplifies the first magnetometer output signal from magnetometer 102 to produce a first amplifier signal, and (ii) amplifier 109 receives and responsively amplifies the second magnetometer output signal from magnetometer 104 to produce a second amplifier signal. The first amplifier signal may comprise a continuous stream of output signals from amplifier 108 and the second amplifier signal may comprise a continuous stream of output signals from amplifier 109.

Another example of an amplifier arrangement is where the amplifiers 108, 109 each comprise one or more amplifiers (e.g. one or more amplifiers to provide multi-stage amplification), and/or other components, to produce a desired level of amplification for each amplifier 108, 109.

As yet another example, an amplifier arrangement may comprise a single amplifier (not shown) coupled to the magnetometers 102, 104 via a switch (not shown). In this regard, the switch may comprise a multiplex switch that sequentially couples (i) the first magnetometer output signal, and then (ii) the second magnetometer output signal, to the single amplifier. An amplifier output signal of the single amplifier may be provided to one analog-to-digital converter (not shown) that converts the amplifier output signal (in analog form) to a digital signal for use by the processor 112. An advantage to this arrangement is that only a single processor input at the processor 112 is required for receiving a digitized amplifier output signal that includes data representing both the first and second magnetometer output signals. Other examples of the amplifier arrangement are also possible.

As shown in FIG. 1, amplifier 108 is coupled to the analog-to digital converter (ADC) 110, and amplifier 109 is coupled to the ADC 111. The ADC 110 receives the first amplifier signal from amplifier 108 and produces a first digital signal representative of (i) the first amplifier signal, and (ii) the magnetic field sensed by magnetometer 102. The ADC 111 receives the second amplifier signal from amplifier 109 and produces a second digital signal representative of the (i) second amplifier signal, and (ii) the magnetic field sensed by magnetometer 104.

ADC 110 and ADC 111, shown as separate devices, are coupled to the processor 112. Alternatively, ADC 110 and ADC 111 could be integrated into the processor 112 as a single integrated analog-to-digital converter. In this regard, the processor 112 could have two ports for receiving the first and second amplifier signals and a means to provide the first and second amplifier signals to the analog-to-digital converter integrated into the processor. ADC 110 and ADC 111 could also be integrated as a single analog-to-digital converter external to the processor 112. In this regard, the first and second amplifier signals could be coupled to individual channels of the single analog-to-digital converter external to the processor 112. Other examples of a single analog-to-digital converter for receiving output signals from two or more amplifiers (or magnetometers) are also possible.

The processor 112 could include one or more processors (e.g. parallel processors), such as a general purpose programmable microprocessor and/or a digital signal processor. The processor 112 could include a plurality of ports that are arranged in various formats such as ports dedicated to perform specific functions defined by a processor manufacturer and ports configurable by a user to perform user-specific functions. A port is a hardware location for passing signals into and/or out of the processor 112. In this regard, the signals could comprise data signals and/or power signals.

The data storage 114 may be arranged in various configurations. Preferably, the data storage 114 comprises a computer readable medium that may include any volatile or non-volatile memory readable by the processor 112. An example of volatile memory is Random Access Memory (RAM). An example of non-volatile memory is Electronically Erasable Programmable Read Only Memory (EEPROM). The data storage 114 could include one or more segments of data storage such as a first segment of data storage located internal to the processor 112 and a second segment of data storage located external to the processor 112.

The data storage 114 stores a variety of data such as (i) program instructions executable by the processor 112, (ii) calibration coefficients, and (iii) values of the first and second digital signals. The data storage 114 could store other types of data as well.

2. Overview of Calibrating a Magnetic Compass by Trimming Signals

The magnetic compass 100 may be calibrated by trimming any of a variety of compass signals or combination of compass signals. For example, the compass 100 may be calibrated by trimming a first magnetometer output signal produced by the magnetometer 102, and/or a second magnetometer output signal produced by the magnetometer 104. In this regard, trimming the first and/or second magnetometer output signals allows the compass 100 to compensate for a mismatch in the sensitivity level between magnetometers 102 and 104. Eliminating a mismatch in the sensitivity level between magnetometers 102 and 104 allows the magnetometers 102 and 104 to each produce an output signal of the same level for a given magnetic field applied to the magnetometers 102 and 104.

As another example, the compass 100 may be calibrated by trimming a first amplifier signal produced by the amplifier 108, and/or a second amplifier signal produced by the amplifier 109. In this regard, trimming the first and/or second amplifier signals allows the compass to compensate for a mismatch in amplification levels between the amplifiers 108 and 109. Eliminating a mismatch in amplifier levels between the amplifiers 108 and 109 allows the amplifiers 108 and 109 to each produce an amplifier output signal with the same level of amplification for a given input signal applied to the amplifiers 108 and 109.

As yet another example, the compass 100 may be calibrated by trimming a first digital signal produced by the ADC 110 and/or a second digital signal produced by the ADC 111. In this regard, the trimming (adjusting or scaling) the first and/or second digital signals provides a method for compensating for (i) a mismatch in sensitivity level between the magnetometers 102 and 104, and/or (ii) a mismatch in amplifier levels between the amplifiers 108 and 109. Other examples of compass signals that may be trimmed are also possible.

The processor 112 may carry out the calibration of the magnetic compass 100 by executing program instructions stored at the data storage 114. In this regard, the program instructions include program instructions for calibration. As an example, the program instructions for calibration may be executable to facilitate providing a voltage, such as a voltage equivalent to a processor supply voltage, at a port coupled to a network. In this regard, the voltage at the port provides for a self-trimming current to pass through the network. Various voltage levels may be applied at the port coupled to the network so that a variety of self-trimming current levels may pass through the network, respectively.

The program instructions for calibration may include program instructions for computing a calibration coefficient. A calibration coefficient is a constant number used to calibrate the magnetic compass 100. As an example, program instructions to compute a calibration coefficient may include instructions to (i) supply a voltage at port 119 so as to produce a self-trimming current that passes through the coil 106, (ii) read a value of the first digital signal from ADC 110 and a value of the second digital signal from ADC 111, while the self-trimming current is passing through the coil 106, so as to obtain a first digital value and a second digital value, respectively, (iii) stop supplying the voltage at port 119 so that the self-trimming current does not pass through the coil 106, and (iv) read a value of the first digital signal from ADC 110 and a value of the second digital signal from ADC 111, while the self-trimming current is not passing through the coil 106, to obtain a third digital value and a fourth digital value, respectively. Further, the instructions to compute a calibration coefficient may include (i) an instruction to subtract the third digital value from the first digital value to obtain a first difference value and to subtract the fourth digital value from the second digital value to obtain a second difference value, and (ii) an instruction to divide an absolute value of the first difference value by an absolute value of the second difference value. Other examples of program instructions for computing a calibration coefficient are also possible.

The program instructions for calibration may include one or more instructions for applying a calibration coefficient. As an example, an instruction for applying a calibration coefficient may comprise multiplying a digital value produced by an ADC by the calibration coefficient. As another example, an instruction for applying a calibration coefficient may include an instruction to read a value of a digital signal from ADC 110 so as to obtain a digital value, and then to multiply the digital value by the calibration coefficient. In this regard, the digital value could represent the output signal from amplifier 108 and/or the output signal from magnetometer 102. Instructions to apply a calibration coefficient could include instructions to apply the calibration coefficient to more than one digital value, such as a first digital value representing the output of ADC 110 and a second digital value representing the output of ADC 111, or a stream of digital values from ADC 110 or ADC 111.

In addition to using a self-trimming current in combination with other components of a magnetic compass implementation to calibrate the compass, the self-trimming current in combination with other components of a magnetic compass implementation may facilitate verifying calibration of the compass. The self-trimming current provides for calibration and/or calibration verification, without the need to use calibration equipment external to the compass.

3. First Exemplary Network

FIG. 2 illustrates a system 117 arranged according to an exemplary embodiment of the present invention. The system 117 includes a network 118 that is coupled to the processor 112 at a port 119. The processor 112 may have other ports in addition to port 119. For example, the processor 112 may have one or more input ports, such as an input ports that is coupled to receive the output of ADC 110 or ADC 111. As another example, the processor may have one or more output ports (in addition to port 119) that may be driven to various voltage levels, such as a voltage level of zero volts, or a voltage equivalent to a supply voltage provided to the processor 112.

The network 118 is coupled to the port 119 by a circuit lead 120. The circuit lead 120 also couples to an impedance 122 within the network 118. The network 118 includes the coil 106 coupled to the impedance 122 by a circuit lead 124, and an electrical ground 128 coupled to the coil 106 by a circuit lead 126. The impedance 122 could be a resistor or another type of impedance. The electrical ground 128 could be electrically connected to other electrical grounds within the system 117.

In general, the processor 112 may execute one or more program instructions for using the ports of the processor 112. For example, the processor 112 may execute program instructions to periodically sample the voltage level of a port configured as an input port. As another example, the processor 112 may execute program instructions so that various levels of voltage are applied at a port configured as an output port. In this regard, the processor 112 may execute program instructions to provide a voltage of zero (or approximately zero) volts at the output port under a first set of circumstances, or a voltage equivalent (or approximately equivalent) to the processor supply voltage under a second set of circumstances. Other examples of the processor 112 executing program instructions for using the ports of the processor 112 are also possible.

In particular, the processor 112 may execute program instructions that facilitate providing the processor supply voltage at port 119. The network 118 provides a means for current to flow from the port 119 to the electrical ground 128 when a voltage is applied to the port 119. The current that flows through the network 118 is a self-trimming current because it facilitates calibrating the system 117 without any external calibration equipment. The processor 112 may execute other program instructions that facilitate supplying a voltage of approximately zero volts at port 119 so that the self-trimming current stops flowing through the network 118.

A self-trimming current passing through the network 118 facilitates calibration of system 117 by driving the coil 106 in order to produce a calibration magnetic field. The calibration magnetic field is applied to the magnetometers 102, 104. A response of the magnetometers 102, 104 to the calibration magnetic field can be measured by reading a first set of digital values provided by the ADC 110 and ADC 111 while the calibration magnetic field is applied to the magnetometers 102, 104. A set of digital values may include one or more digital values from each of a plurality of magnetometers, such as magnetometers 102, 104.

The processor 112 could also read a second set of digital values provided by the ADC 110 and ADC 111 when the self-trimming current is not passing through the network 118. A comparison of the first set of digital values to the second set of digital values can be made to determine the effect of applying the calibration magnetic field to the magnetometers 102, 104.

One advantage of the network 118 in comparison to other networks that will be described below is that only a single port, port 119, is required to couple the processor 112 to the network 118. The network 118 therefore could be used where the processor 112 has a limited number of ports available for coupling to a network for performing compass calibration.

4. Second Exemplary Network

Figure 3:
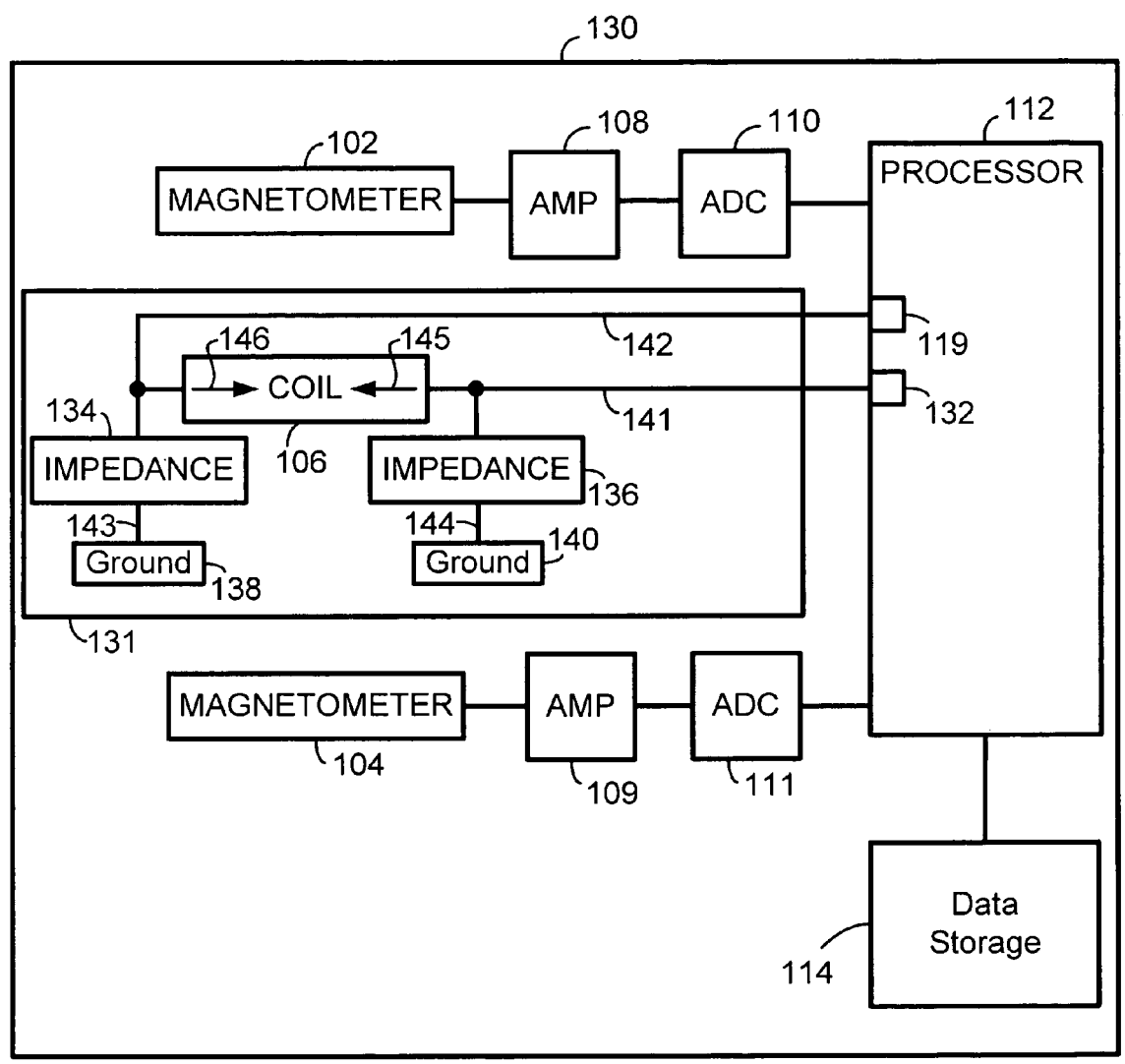
FIG. 3 depicts a preferred embodiment of the present invention as a system that includes a second network embodiment.

FIG. 3 illustrates a system 130 arranged according to another exemplary embodiment of the present invention. The system 130 includes a network 131 that is coupled to both the port 119 and a port 132, of the processor 112. The processor 112 may have other ports in addition to port 119 and port 132, such as an input port coupled to receive the output of ADC 110 or ADC 111, and one or more ports for (i) sending data to the data storage 114, and (ii) receiving data from the data storage 114.

The network 131 includes the coil 106, impedances 134 and 136, electrical grounds 138 and 140, and circuit leads 141, 142, 143, 144. Circuit lead 141 couples the coil 106 and impedance 136 to the processor 112 at port 132. Circuit lead 142 couples the coil 106 and impedance 134 to the processor 112 at port 119. Circuit lead 143 couples impendence 134 to electrical ground 138 and circuit lead 144 couples impedance 136 to electrical ground 140.

Impedances 134 and 136 could be resistors or another type of impedance. The impedances 134 and 136 could be same or different in value.

System 130 provides for passing a first and a second self-trimming current through the coil 106 by controlling the voltages applied to port 119 and port 132. The processor 112 may execute program instruction to control the voltage applied to port 119 and to port 132. For example the processor 112 may execute program instructions that cause the voltage level at port 132 to be equivalent to the processor supply voltage and the voltage level at port 119 to be zero volts. In this regard, a first self-trimming current will (i) pass into the network 131 via circuit lead 141, (ii) pass through the coil 106 in direction 145, and (iii) produce a first calibration magnetic field that is applied to the magnetometers 102 and 104. Other examples of voltage levels applied to port 119 and to port 132 for producing the first self-trimming current are also possible.

In addition to placing the port 119 at zero volts when the first self-trimming current is applied, the processor 112 may change the impedance level of port 119. In this regard, the processor 112 may couple port 119 to a high level of impedance so as to limit the amount of current of the first self-trimming current that flows into port 119, or to a low level of impedance and to a ground source so as to allow a relatively higher portion of the first self-trimming current to flow into port 119.

As another example, the processor 112 may execute program instructions that cause the voltage level at port 119 to be equivalent to the processor supply voltage and the voltage level at port 132 to be zero volts. In this regard, a second self-trimming current will (i) pass into the network 131 via circuit lead 142, (ii) pass through the coil in direction 146, and (iii) produce a second calibration magnetic field that is applied to the magnetometers 102 and 104. Other examples of voltage levels applied to port 119 and to port 132 for producing the second self-trimming current are also possible.

In addition to placing the port 132 at zero volts when the second self-trimming current is applied, the processor 112 may change the impedance level of port 132. In this regard, the processor 112 may couple port 132 to a high level of impedance so as to limit the amount of current of the second self-trimming current that flows into port 132, or to a low level of impedance and to a ground source so as to allow a relatively higher portion of the second self-trimming current to flow into port 132.

A system, such as system 130, that can pass first and second self-trimming currents has advantages over a system that can only pass a first self-trimming current. A first advantage is that the second self-trimming current allows for the processor 112 to determine a second calibration coefficient based on a magnetic field generated by passing the second self-trimming current through the coil 106. The second self-trimming current passes through the coil 106 in a direction opposite to the direction of the first self-trimming current. The second calibration coefficient may be used to verify the accuracy of the first calibration coefficient, which is determined in part by passing the first self-trimming current through the coil 106.

A second advantage of a system capable of passing first and second self-trimming currents through a field-generating coil is that the processor 112 may switch to using the second self-trimming current for use in determination of one or more calibration coefficients when the first self-trimming current causes a saturation condition in system 130. A saturation condition may occur when a system component within the magnetic compass has reached its maximum handling capacity. For example, saturation of magnetometer 102 may occur when the first self-trimming current passes through coil 106 to create a calibration magnetic field that combines with the Earth's magnetic field and stray magnetic fields to create a magnetic field that exceeds the magnitude of a magnetic field which magnetometer 102 is designed to handle. Other examples of compass components becoming saturated are also possible.

To overcome a saturation condition caused by passing the first self-trimming current through the coil, the processor 112 may stop applying the voltage at the port that causes the first self-trimming current to pass through the coil. To continue calibrating the compass after overcoming the saturation condition, the processor may apply a voltage at a second port to cause a second self-trimming current to pass through the coil.

Passing the second self-trimming current through the coil 106, in a direction opposite of the direction of the first self-trimming current, changes the direction of the calibration magnetic field produced by the coil 106, as compared to the direction of the calibration magnetic field produced by the coil 106 when the first self-trimming current is passing through the coil 106. The change in direction of the calibration magnetic field may avoid the saturation condition and allow for calibration of the system.

In addition to changing the direction of current flowing through the coil, the current level of a self-trimming current flowing through the coil may be changed. In one regard, if the processor 112 supplies the same level of voltage at the ports 119, 132 to produce the first and second self-trimming currents, respectively, the current level flowing through the coil 106 may change when the processor switches from the first self-trimming current to the second self-trimming current by using a first level of impedance for impedance 134 and a second level of impedance for level 136. In another regard, for example, the processor may reduce the voltage supplied at one or both of ports 119, 132 so as to reduce the current level flowing though the coil 106. Other examples of changing the current level of a self-trimming current are also possible.

5. Third Exemplary Network

Figure 4:
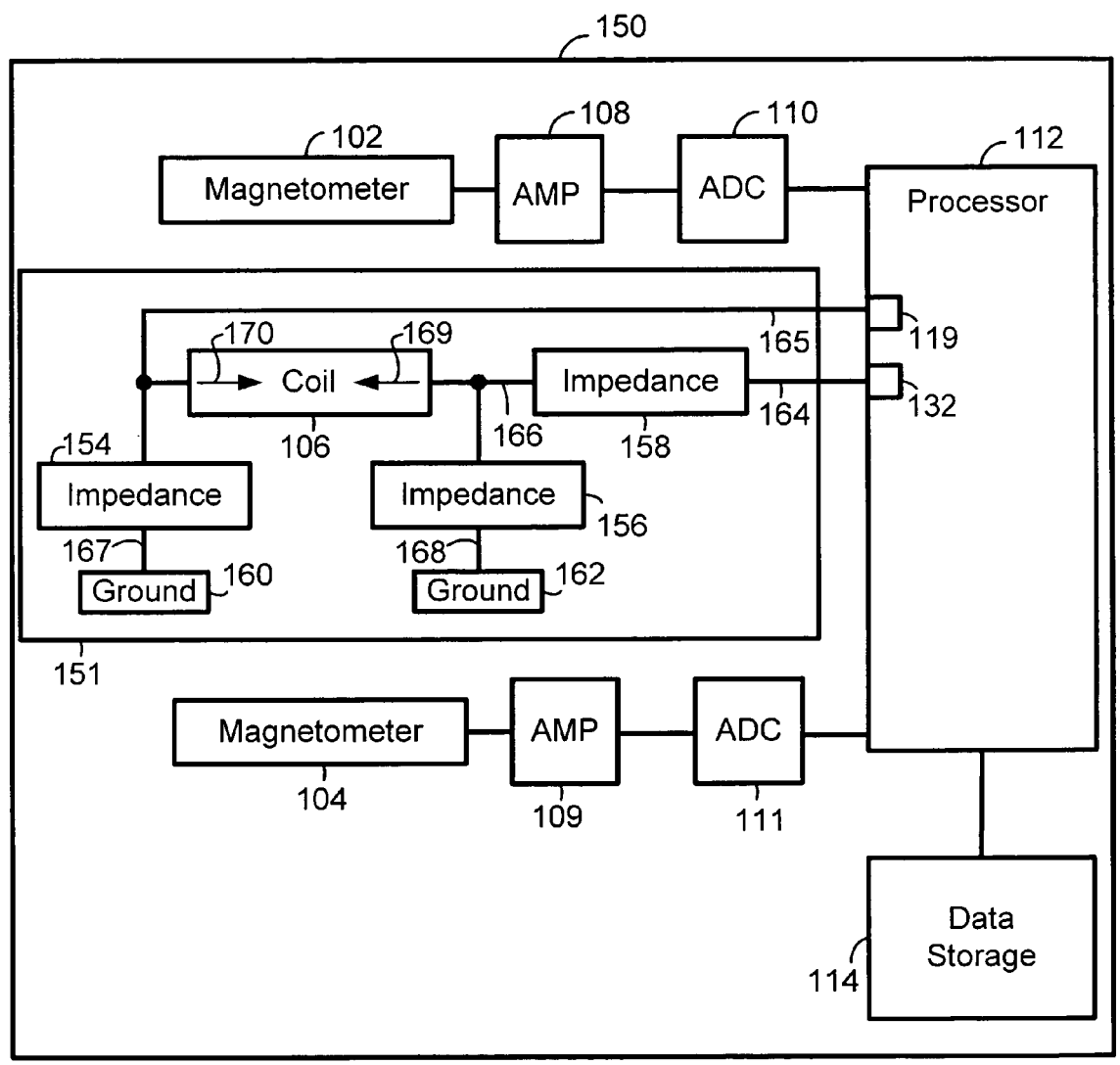
FIG. 4 depicts a preferred embodiment of the present invention as a system that includes a third network embodiment.

FIG. 4 illustrates a system 150 that includes the magnetometers 102 and 104, the amplifiers 108 and 109, the ADC 110, the ADC 111, the processor 112, the data storage 114, and a network 151. The network 151 is coupled to the processor 112 at the ports 119 and 132. The network 151 comprises (i) the coil 106, (ii) impedances 154, 156, 158, (iii) electrical grounds 160, 162, and (iv) circuit leads 164, 165, 166, 167, 168.

Circuit lead 164 couples impedance 158 to the processor 112 at port 132. Circuit lead 165 couples the coil 106 and impedance 154 to the processor 112 at port 119. Circuit lead 166 couples the coil 106 to impedances 156 and 158. Circuit lead 167 couples impendence 154 to electrical ground 160 and circuit lead 168 couples impedance 156 to electrical ground 162.

The impedances 154, 156, 158 may be resistors or another type of impedance. The amount of impedance of impedances 154, 156, 158 may be equivalent levels of impedance or different levels of impedance. The electrical grounds 160, 162 may be electrically connected together and/or electrically connected to other electrical grounds within the system 150.

The system 150 provides for passing first and second self-trimming currents through the coil 106. The processor 112 may execute one or more program instructions stored at the data storage 114 in order to provide a first voltage at port 132 so as to produce a first self-trimming current that flows into the network 151 via circuit lead 164. The first self-trimming current passes through the coil 106 in a direction 169 and produces a first calibration magnetic field that is applied to the magnetometers 102 and 104.

The processor 112 may also execute one or more program instructions stored at the data storage 114 in order to provide a second voltage at port 119 so as to produce a second self-trimming current that flows into the network 151 via circuit lead 165. The second self-trimming current passes through the coil 106 in a direction 170 and produces a second calibration magnetic field that is applied to the magnetometers 102 and 104.

The magnitude of the first self-trimming current passing through the coil 106 may be the same as or different from the magnitude of the second self-trimming current passing through the coil 106. The magnitude of the first self-trimming current passing through the coil 106 as compared to the magnitude of the second self-trimming current passing through the coil 106 may differ due to the processor 112 providing the first voltage having a first voltage level and the second voltage having a second voltage level.

The magnitude of the first self-trimming current passing through the coil 106 as compared to the magnitude of the second self-trimming current passing through the coil 106 may differ even if the processor 112 applies voltage having the same voltage level to (i) port 132 to produce the first self-trimming current, and (ii) port 119 to produce the second self-trimming current. In this regard, the different magnitudes of current may be achieved based on the selection of impedance levels for the impedances 154, 156, and 158.

6. Variation of Systems with First, Second, and Third Exemplary Networks

Figure 5:
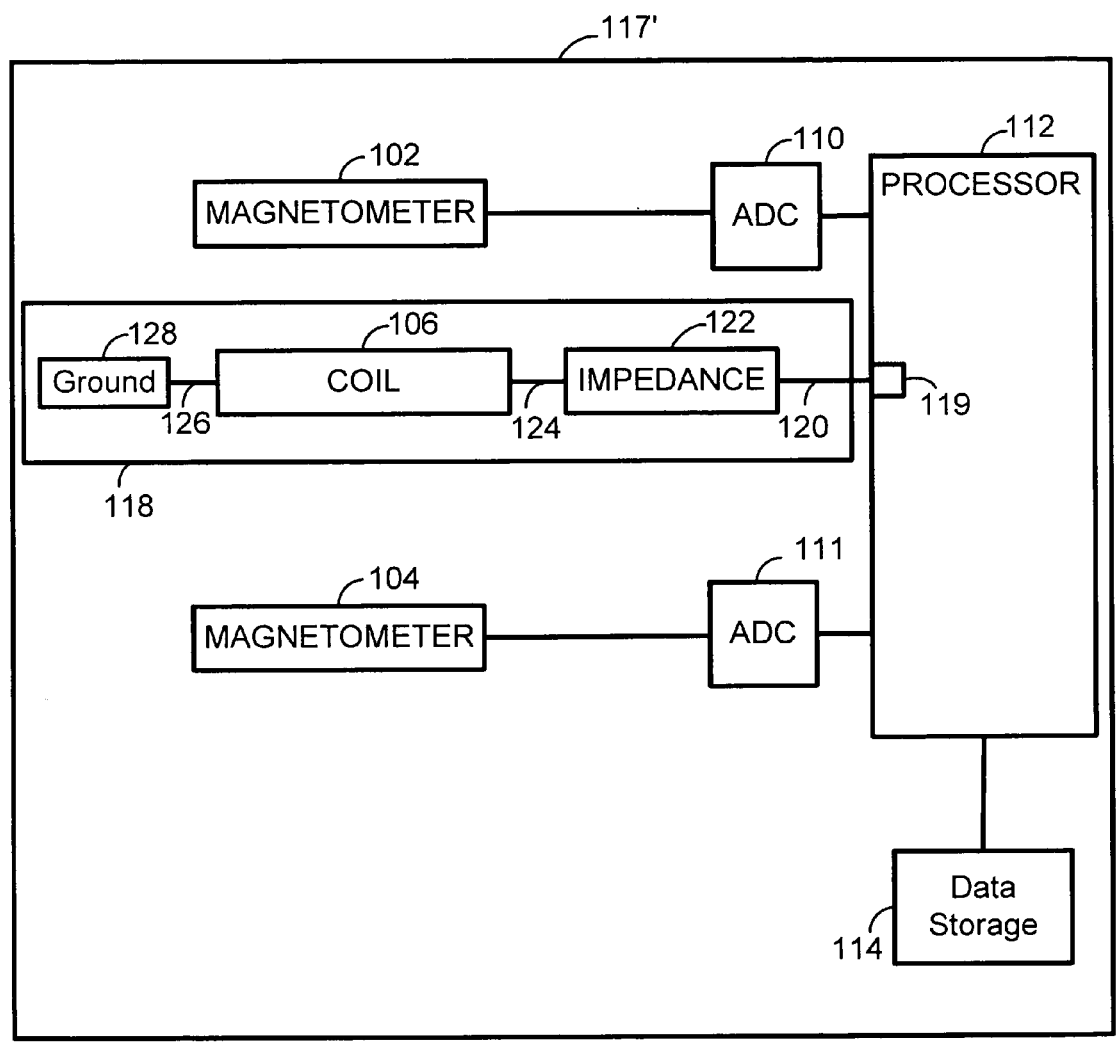
FIG. 5 depicts a variation of the preferred embodiment shown in FIG. 2.

FIG. 5 illustrates a system 117' that is similar to the system 117, shown in FIG. 2, except magnetometer 102 couples directly to ADC 110 and magnetometer 104 couples directly to ADC 111. System 117' does not include amplifiers 108 and 109.

Figure 6:
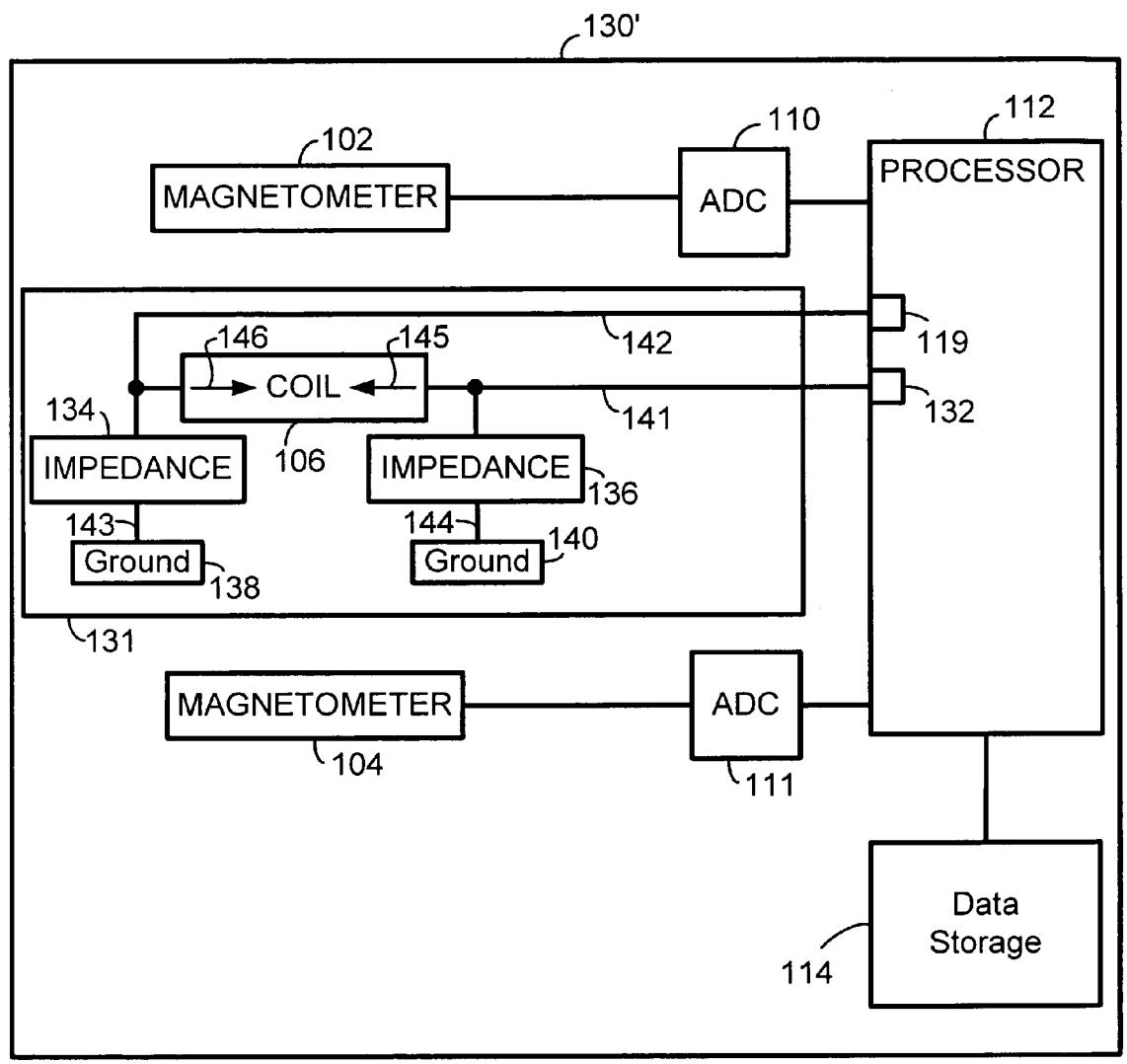
FIG. 6 depicts a variation of the preferred embodiment shown in FIG. 3.

FIG. 6 illustrates a system 130' that is similar to the system 130, shown in FIG. 3, except magnetometer 102 couples directly to ADC 110 and magnetometer 104 couples directly to ADC 111. System 130' does not include amplifiers 108 and 109.

Figure 7:
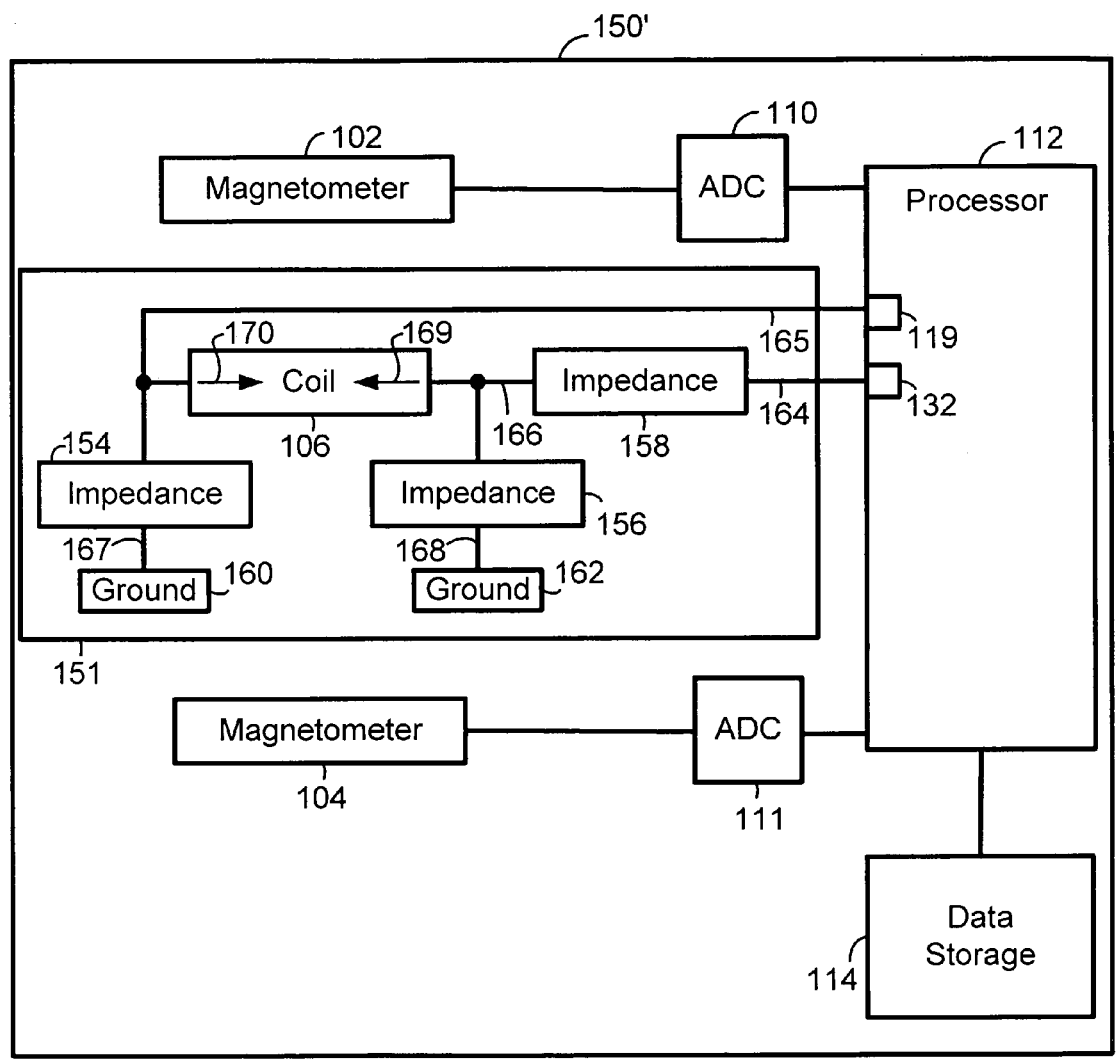
FIG. 7 depicts a variation of the preferred embodiment shown in FIG. 4.

FIG. 7 illustrates a system 150' that is similar to the system 150, shown in FIG. 3, except magnetometer 102 couples directly to ADC 110 and magnetometer 104 couples directly to ADC 111. System 150' does not include amplifiers 108 and 109.

In systems 117', 130', and 150', the ADC 110 converts a first magnetometer output signal from the magnetometer 102 and responsively produces a first digital signal that indicates the magnetic field sensed by the magnetometer 102. The ADC 111 converts a second magnetometer signal from the magnetometer 104 and responsively produces a second digital signal that indicates the magnetic field sensed by the magnetometer 104.

The processor 112 may execute program instructions stored at the data storage 114 in order to calibrate the system 117', the system 130', or the system 150.' In this regard, the program instructions may include instructions (as described above) to (i) set the voltage levels of ports 119 and 132 so that a first self-trimming current and/or a second self-trimming current pass through the coil 106, (ii) compute a calibration coefficient, and (iii) apply the calibration coefficient. Examples of compass signals that may be trimmed to calibrate systems 117', 131', and 150' include: (i) the first magnetometer output signal from magnetometer 102, (ii) the second magnetometer output signal from magnetometer 104, (iii) the first digital signal produced by ADC 110, and (iv) the second digital signal produced by the ADC 111.

7. Exemplary Magnetic Compass

Figure 8:
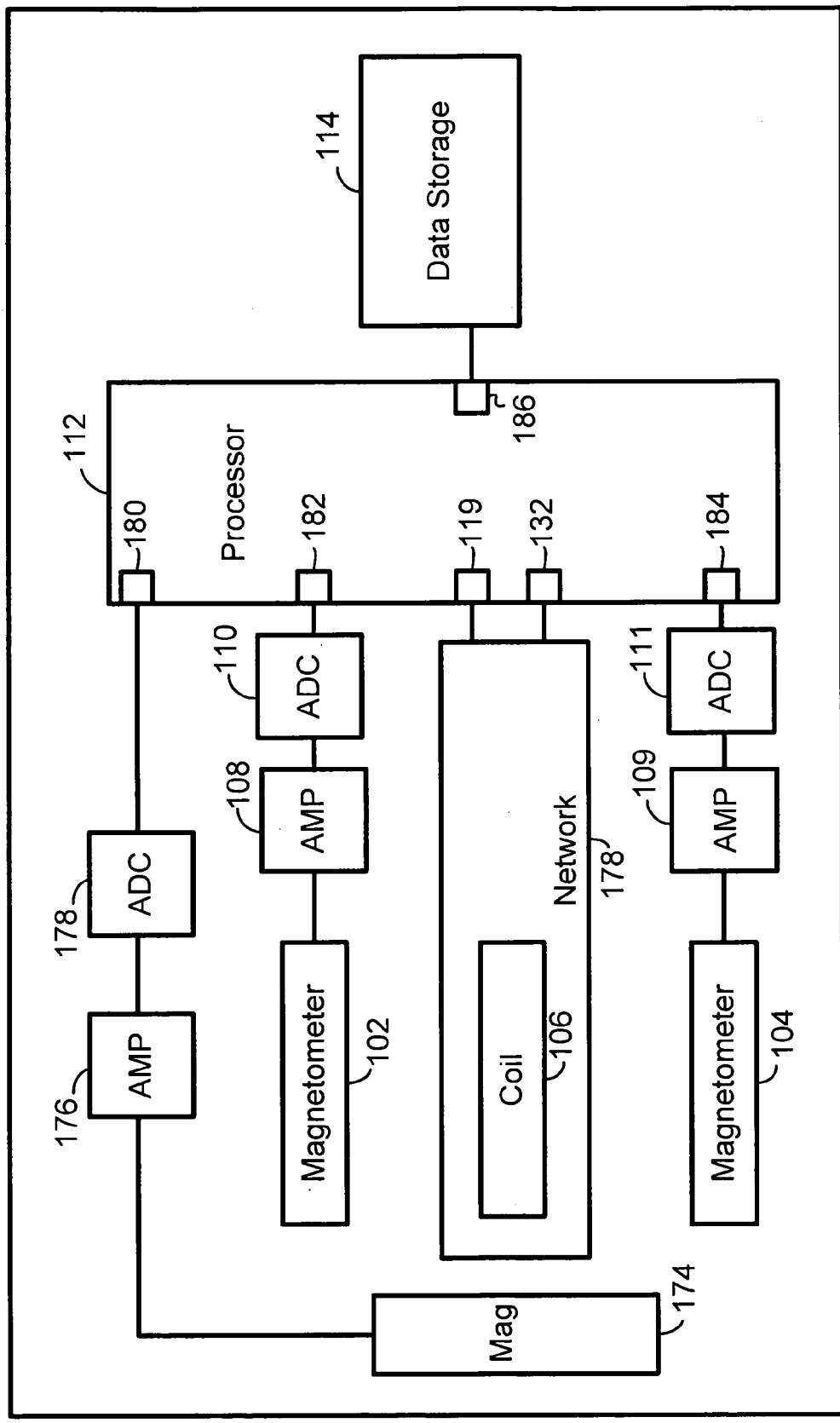
FIG. 8 depicts an exemplary magnetic compass.

FIG. 8 depicts a magnetic compass 172 that includes (i) the magnetometer 102, (ii) the magnetometer 104, (iii) a magnetometer 174, (iv) the amplifier 108, (v) the amplifier 109, (vi) an amplifier 176, (vii) the ADC 110, (viii) the ADC 111, (ix) an ADC 178, (x) the processor 112, (xi) the data storage 114, and (xii) a network 178. The magnetic compass 172 as shown in FIG. 8 is a three-dimensional magnetic compass.

Alternatively, the magnetic compass 172 may be arranged as a two-dimensional compass by using only 2 of the 3 combinations of magnetometer, amplifier, and ADC coupled to the processor. In this regard, only 2 of the 3 combinations of magnetometer, amplifier, and ADC coupled to the processor, need to be installed in the magnetic compass 172. A first combination is magnetometer 102, amplifier 108, and ADC 110. A second combination is magnetometer 104, amplifier 109, and ADC 111. A third combination is magnetometer 174, amplifier 176, and ADC 178.

The processor 112 includes the port 119 and the port 132, for coupling to the network 178. The processor 112 includes an input port 180 for coupling to the ADC 178, an input port 182 for coupling to the ADC 110, and an input port 184 for coupling to the ADC 111. Further, the processor 112 includes one or more ports 186 for coupling to the data storage 114.

Magnetometer 102 is coupled to amplifier 108 and provides a first magnetometer output signal to amplifier 108. Amplifier 108 amplifies the first magnetometer output signal and produces a first amplified magnetometer output signal. Amplifier 108 is coupled to ADC 110 and sends the first amplified magnetometer output signal to ADC 110. ADC 110 converts the first amplified magnetometer output signal to a first digital signal and sends the first digital signal to processor 112. The first digital signal represents a magnetic field acting on and sensed by the magnetometer 102. The magnetometer 102 may be arranged to sense the magnetic field in a first sensing direction.

Magnetometer 104 is coupled to amplifier 109 and provides a second magnetometer output signal to amplifier 109. Amplifier 109 amplifies the second magnetometer output signal and produces a second amplified magnetometer output signal. Amplifier 109 is coupled to ADC 111 and sends the second amplified magnetometer output signal to ADC 111. ADC 111 converts the second amplified magnetometer output signal to a second digital signal and sends the second digital signal to processor 112. The second digital signal represents a magnetic field acting on and sensed by the magnetometer 104. The magnetometer 104 may be arranged to sense the magnetic field in a second sensing direction.

Magnetometer 174 is coupled to amplifier 176 and provides a third magnetometer output signal to amplifier 176. Amplifier 176 amplifies the third magnetometer output signal and produces a third amplified magnetometer output signal. Amplifier 176 is coupled to ADC 178 and sends the third amplified magnetometer output signal to ADC 178. ADC 178 converts the third amplified magnetometer output signal to a third digital signal and sends the third digital signal to the processor 112. The third digital signal represents a magnetic field acting on and sensed by the magnetometer 174. The magnetometer 174 may be arranged to sense the magnetic field in a third sensing direction. Further, the magnetometer 174 ideally is of the same type of magnetometer as magnetometer 102 and magnetometer 104.

The amplifier 176 may be arranged as the amplifier 108 and the amplifier 109, as described above. Alternatively, the magnetic compass 172 may use a switch (not shown) to couple the magnetometer 102, the magnetometer 104, and the magnetometer 176 to a single amplifier for amplifying a sample of each magnetometer output signal in turn, and for supplying an amplified magnetometer output signal to a single ADC (not shown). Other arrangements for amplification of magnetometer output signals and for digitizing amplified magnetometer outputs signals are also possible.

The network 178 may be arranged in various configurations. For example, the network 178 may be arranged as the network 118 described above and shown in FIG. 2. In such a configuration, the network 178 is not coupled to the port 132. Further, in such a configuration, the network 178 passes a first self-trimming current through the coil 106 when a voltage is applied at the port 119. The first self-trimming current that flows through the coil 106 produces a magnetic field in proximity to the magnetometer 102, the magnetometer 104, and the magnetometer 174.

As another example, the network 178 may be arranged as the network 131 described above and shown in FIG. 3, or as the network 151 described above and shown in FIG. 4. In either of these configurations, the network 178 couples to the processor 112 at port 119 and at port 132. Further, in either of these configurations, the network 178 passes a first self-trimming current or a second self-trimming current through the coil 106 when a voltage is applied at port 119 or port 132, respectively. The first self-trimming current and the second self-trimming current that flow through the coil 106 produce respective magnetic fields in proximity to the magnetometer 102, the magnetometer 104, and the magnetometer 174.

Program instructions may be executed to calibrate the magnetic compass 172 by trimming compass signals produced within the magnetic compass 172. In this regard, the program instructions may include the programs instructions as described above, as well as program instructions to determine a difference value of digital values produced by the ADC 178 when a self-trimming current is flowing through the network 178 and when a self-trimming current is not flowing through the network 178, for use in computing one or more calibration coefficients for calibrating the magnetic compass 172.

8. Exemplary Method of Calibrating a Magnetic Compass

Figure 9:
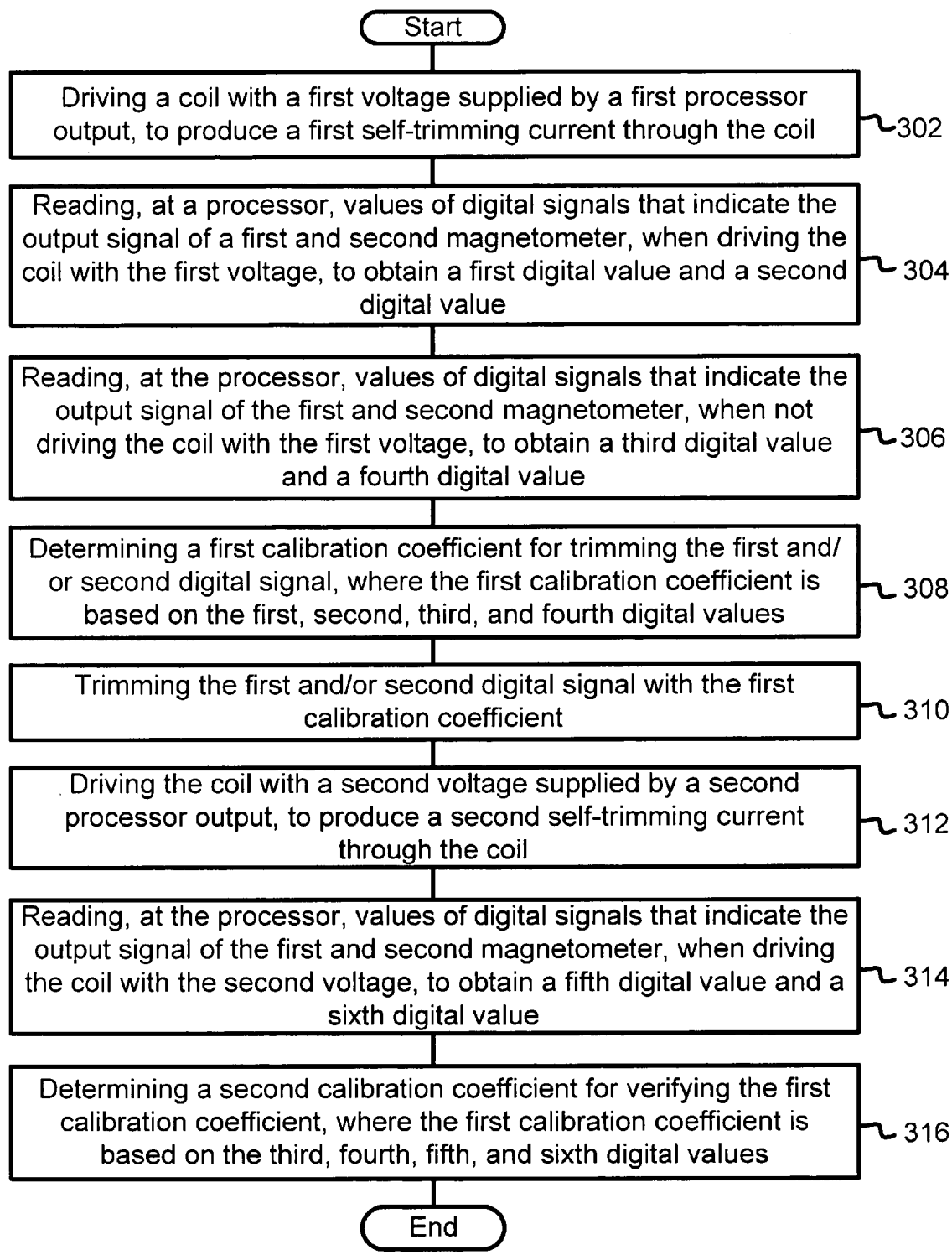
FIG. 9 is a flow chart depicting functional blocks for use with a preferred embodiment of the invention.

FIG. 9 is a flow chart illustrating a method of magnetic compass calibration and verification for a magnetic compass that comprises a processor, a field-generating coil coupled to the processor, at least first and second magnetometers, and an analog-to-digital signal converting means that converts at least a first analog signal to a first digital signal and a second analog signal to a second digital signal. The method illustrated in FIG. 9 will be described with respect to a magnetic compass that includes a system such as system 130 shown in FIG. 3.

The first and second analog signals each comprise a continuous stream of signals. The stream of signals may be produced by various compass components, such as the magnetometers 102, 104, or the amplifiers 108, 109. The first and second digital signals each comprise a plurality of digital values representing the first and second analog signals, respectively. The first and second digital signals could be produced by ADC 110 and ADC 111, respectively.

Referring to FIG. 9, at Block 302, a field-generating coil is driven with a first voltage supplied by a first processor output so as to produce a first self-trimming current that flows through the coil. The first self-trimming current passing though the coil generates a first magnetic field that affects magnetometers located near the coil. As an example, the processor 112 may supply a voltage at port 132 so as to produce a current that flows through the coil 106. In turn, the coil 106 generates a first magnetic field that is applied to magnetometers 102 and 104.

Driving the coil 106 with the first voltage may involve the processor 112 executing program instructions, such as one or more program instructions to configure a processor port as an output port, and one or more instructions to control circuitry within the processor 112 so that a voltage is supplied to the output port.

Next, at Block 304 a processor reads values of a first digital signal and a second digital signal, when the coil is being driven by the first voltage, so as to obtain a first digital value and a second digital value, respectively. In this regard, the first digital signal indicates the output signal of a first magnetometer (such as magnetometer 102), and the second digital signal indicates the output signal of a second magnetometer (such as magnetometer 104). The output signals of the magnetometers may be analog signals sent to an analog-to-digital signal converting means for conversion to digital signals.

Preferably, the value of the first digital signal and the value of the second digital signal are obtained simultaneously so that characteristics of the magnetic field produced by the coil 106 are the same when the value of the first digital signal and the value of the second digital signal are obtained. Examples of characteristics of the magnetic field include a magnetic field direction and a magnetic field intensity.

Next, at Block 306 a processor reads values of digital signals that indicate the output signal of the first magnetometer and a second magnetometer, when the coil is not being driven by the first voltage, so as to obtain a third digital value and a fourth digital value, respectively. In this regard, for example, the third digital value indicates a value of a magnetic field sensed by the magnetometer 102 when the coil 106 is not producing a magnetic field, and the fourth digital value indicates a value of a magnetic field sensed by the magnetometer 104 when the coil 106 is not producing a magnetic field. The processor 112 may execute the same (or other) program instructions for reading values of digital signals used to obtain the first digital value and the second digital value, except that the processor 112 executes these instructions when the coil 106 is not being driven with the first voltage in order to obtain the third digital value and the fourth digital value.

Next at Block 308, the processor determines a first calibration coefficient, for trimming one or more digital signals, such as the first digital signal and/or the second digital signal produced by ADC 110, 111, respectively. The first calibration coefficient is based on the first digital value, the second digital value, the third digital value, and the fourth digital value. The processor could determine the first calibration coefficient by executing program instructions, such as the instructions to compute a calibration coefficient described above. Other program instructions may also be used to determine the calibration coefficient.

At Block 310, the first calibration coefficient is used to trim the first digital signal and/or the second digital signal, produced by the ADC 110, 111, respectively. As an example, trimming the first digital signal may involve multiplying each value of the first digital signal by the calibration coefficient. As another example, trimming the second digital signal may involve multiplying each value of the second digital signal by the calibration coefficient. Alternatively, a first calibration coefficient may be determined for use in multiplying each value of the first digital signal, and another calibration coefficient may be determined for use in multiplying each value of the second digital signal, to trim the first and second digital signals. Other examples of trimming the first digital signal and/or the second digital signal are also possible.

At Block 312, the magnetic compass begins performing functions to verify the first calibration coefficient. As shown at Block 312, the coil is driven with a second voltage supplied by a second processor output in order to produce a second self-trimming current that passes through the coil 106. As an example, the processor 112 may supply a voltage at the port 119 to produce the second self-trimming current.

The second self-trimming current passing through the coil 106 results in the coil 106 producing a second magnetic field that acts on the magnetometers 102 and 104. In this regard, the second magnetic field may be different from the first magnetic field produced by the coil when the first self-trimming current passes through the coil, so that a second calibration coefficient can be determined based on a combination of magnetic fields that differs from the combination of magnetic fields used in determining the first calibration coefficient.

Next at Block 314, the processor reads values of the digital signals that indicate the output of the first and second magnetometers when the coil is being driven with the second voltage, so as to obtain a fifth digital value and a sixth digital value, respectively. Preferably, the value of the fifth digital signal and the value of the sixth digital signal are obtained simultaneously so that characteristics of the magnetic field produced by the coil 106 when being driven with the second voltage are the same when the value of the fifth digital signal and the value of the sixth digital signal are obtained.

The processor 112 may execute the same (or different) program instructions used for reading digital signals used to obtain values of the first and second digital values in order to obtain values of the fifth and sixth digital values, except that the processor 112 executes the instructions when the coil 106 is being driven with the second voltage in order to obtain the fifth and sixth digital values.

Next, at Block 316, a second calibration coefficient may be determined for use in verifying the first calibration coefficient. As an example, the processor 112 may determine the second calibration coefficient by executing program instructions, such as the program instructions described above for verifying the first calibration coefficient. The second calibration coefficient is based on the third digital value, the fourth digital value, the fifth digital value, and the sixth digital value. In this regard, the second calibration coefficient is based on digital values obtained when (i) no self-trimming current is flowing through the coil 106, and (ii) the second self-trimming current is flowing through the coil.

After determining the second calibration coefficient, the processor 112 may execute one or more program instructions to verify the first calibration coefficient. As an example, the processor 112 may execute program instructions to compare the first and second calibration coefficients by determining the difference between the first and second calibration coefficients and then comparing the difference to a given difference value. The given difference value depends on the level of accuracy desired in calibrating the magnetic compass.

If the difference between the first and second calibration coefficients is less than or equal to the given difference value, than the first calibration coefficient is an acceptable calibration coefficient for calibrating the compass. If the difference between the first and second calibration coefficients exceeds the given difference value, the process of determining the first calibration coefficient may be repeated in order to update the first calibration coefficient. The verification steps may also be repeated as necessary until the difference between the first and second calibration coefficients is less than the given difference value. Other examples for verifying the first calibration coefficient are also possible.

9. Conclusion

In view of the many embodiments to which the present invention can be applied, it should be understood that the elements depicted in the figures throughout this document are shown for purposes of example only. It will be understood, however, that changes may be made to the various features described without departing from the true spirit and scope of the invention, as defined by the claims that follow.

I claim:

1. A system comprising:
a first magnetometer that produces a first output signal;
a second magnetometer that produces a second output signal;
an analog-to-digital signal converting means coupled to the first and second magnetometers, wherein the analog-to-digital signal converting means converts (i) the first output signal to a first digital signal, and (ii) the second output signal to a second digital signal;
a processor that receives the first digital signal and the second digital signal; and
a network that includes a coil located in proximity to the first and second magnetometers, wherein (i) the network is coupled to the processor, (ii) the processor provides a first voltage signal at the network for producing a first self-trimming current, and (iii) the coil generates a magnetic field in the vicinity of the first and second magnetometers when the first self-trimming current passes through the coil.

2. The system of claim 1, further comprising data storage for storing program instructions executable by the processor, wherein the program instructions comprise (i) one or more instructions for computing a calibration coefficient, and (ii) one or more instructions for applying the calibration coefficient to trim at least one of the first and second digital signals.

3. The system of claim 2, wherein the one or more instructions for computing the calibration coefficient include (i) an instruction to read values of the first and second digital signals when the first self-trimming current is passing through the network in order to obtain a first digital value and a second digital value, respectively, (ii) an instruction to read values of the first and second digital signals when the first self-trimming current is not passing through the network in order to obtain a third digital value and a fourth digital value, respectively, and (iii) an instruction to divide the absolute value of the difference of the first digital value and the third digital value by the absolute value of the difference of the second digital value and the fourth digital value.

4. The system of claim 3, wherein the one or more instructions for applying the calibration coefficient include an instruction to multiply at least one of the first and second digital signals by the calibration coefficient.

5. The system of claim 1, wherein the processor comprises a first port, the network is coupled to the processor at the first port, and the processor provides the first voltage signal at the first port.

6. The system of claim 5, wherein the network further comprises an impedance having first and second ends, wherein the coil has first and second ends, wherein the first end of the impedance is coupled to the first port, wherein the second end of the impedance is coupled to the first end of the coil, and wherein the second end of the coil is coupled to an electrical ground.

7. The system of claim 6, wherein the impedance is a resistor.

8. The system of claim 5, wherein (i) the processor further comprises a second port, and provides a second voltage at the network for producing a second self-trimming current, and (ii) the coil generates a second magnetic field in the vicinity of the first and second magnetometers when the second self-trimming current passes through the coil.

9. The system of claim 8, wherein the network further comprises first and second impedances each having respective first and second ends, wherein the coil has first and second ends, wherein the first end of the first impedance is coupled to the first port and to the first end of the coil, wherein the first end of the second impedance is coupled to the second port and to the second end of the coil, and wherein the second ends of the first and second impedances are coupled to an electrical ground.

10. The system of claim 9, wherein the first and second impedances are resistors.

11. The system of claim 8, wherein the network further comprises first, second, and third impedances each having respective first and second ends, wherein the coil has first and second ends, wherein the first end of the first impedance is coupled to the first port and to the first end of the coil, wherein the first end of the second impedance is coupled to the second end of the coil and to the first end of the third impedance, wherein the second end of the third impedance is coupled to the second port, and wherein the second ends of the first and second impedances are coupled to an electrical ground.

12. The system of claim 11, wherein the first, second, and third impedances are resistors.

13. The system of claim 1, further comprising:
an amplification means for (i) amplifying the first output signal before the analog-to-digital converter converts the first output signal to the first digital signal, and (ii) amplifying the second output signal before the analog-to-digital converter converts the second output signal to the second digital signal.

14. The system of claim 1, further comprising:
a third magnetometer that (i) produces a third output signal, (ii) is coupled to the analog-to-digital converting means, and (iii) is located in proximity to the coil, wherein the analog-to-digital converting means converts the third output signal to a third digital signal, the processor receives the third digital signal, and the magnetic field is in the vicinity of the third magnetometer; and
data storage for storing program instructions executable by the processor, wherein the program instructions comprise (i) one or more instructions for computing one or more calibration coefficients, and (ii) one or more instructions for applying the one or more calibration coefficients to trim one or more of the first, second, and third digital signals.

15. A system comprising:
a first magnetometer that produces a first output signal;
a second magnetometer that produces a second output signal;
a first amplifier coupled to the first magnetometer for receiving the first output signal, wherein the first amplifier amplifies the first output signal to produce a first amplifier signal;
a second amplifier coupled to the second magnetometer for receiving the second output signal, wherein the second amplifier amplifies the second output signal to produce a second amplifier signal;
an analog-to-digital converter coupled to the first and second amplifiers, wherein the analog-to-digital converter converts the first amplifier signal to a first digital signal and coverts the second amplifier signal to a second digital signal;
a processor that receives the first and second digital signals; and
a network that includes a coil located in proximity to the first and second magnetometers, wherein (i) the network is coupled to the processor, (ii) the processor provides a voltage signal for producing a first self-trimming current, and (iii) the coil generates a magnetic field in the vicinity of first and second magnetometers when the first self-trimming current passes through the coil.

16. The system of claim 15, further comprising data storage for storing program instructions executable by the processor, wherein the program instructions comprise (i) one or more instructions for computing one or more calibration coefficients, and (ii) one or more instructions for applying the one or more calibration coefficients to trim at least one of the first and second digital signals.

17. The system of claim 16, wherein the one or more instructions for computing the one or more calibration coefficients include (i) an instruction to read values of the first and second digital signals when the first self-trimming current is passing through the network in order to obtain a first digital value and a second digital value, respectively, (ii) an instruction to read values of the first and second digital signals when the first self-trimming current is not passing through the network in order to obtain a third digital value and a fourth digital value, respectively, and (iii) an instruction to divide the absolute value of the difference of the first digital value and the third digital value by the absolute value of the difference of the second digital value and fourth digital value.

18. The system of claim 16, wherein the one or more instructions for applying the calibration coefficient include an instruction to multiply at least one of the first and second digital signals by one of the one or more calibration coefficients.

19. The system of claim 15, wherein the processor comprises a first port, the network is coupled to the processor at the first port, and the processor provides the first voltage signal at the first port.

20. The system of claim 19, wherein the network further comprises an impedance having first and second ends, wherein the coil has first and second ends, wherein the first end of the impedance is coupled to the first port, wherein the second end of the impedance is coupled to the first end of the coil, and wherein the second end of the coil is coupled to an electrical ground.

21. The system of claim 19, wherein (i) the processor further comprises a second port, and provides a second voltage signal at the network for producing a second self-trimming current, and (ii) the coil generates a second magnetic field in the vicinity of the first and second magnetometers when the second self-trimming current passes through the coil.

22. The system of claim 21, wherein the network further comprises first and second impedances each having respective first and second ends, wherein the coil has first and second ends, wherein the first end of the first impedance is coupled to the first port and to the first end of the coil, wherein the first end of the second impedance is coupled to the second port and to the second end of the coil, and wherein the second ends of the first and second impedances are coupled to an electrical ground.

23. The system of claim 21, wherein the network further comprises first, second, and third impedances each having respective first and second ends, wherein the coil has first and second ends, wherein the first end of the first impedance is coupled to the first port and to the first end of the coil, wherein the first end of the second impedance is coupled to the second end of the coil and to the first end of the third impedance, wherein the second end of the third impedance is coupled to the second port, and wherein the second ends of the first and second impedances are coupled to an electrical ground.

24. A magnetic compass comprising:
a first magnetometer that produces a first output signal;
a second magnetometer that produces a second output signal;
an amplification means coupled to the first magnetometer and the second magnetometer, wherein the amplification means (i) receives and then amplifies the first output signal to produce a first amplifier signal, and (ii) receives and then amplifies the second output signal to produce a second amplifier signal;
an analog-to-digital signal converting means coupled to the amplification means, wherein the analog-to-digital signal converting means (i) receives and then converts the first amplifier signal to a first digital signal, and (ii) receives and then converts the second amplifier signal to a second digital signal;
a processor that receives the first and second digital signals; and
a network that includes a coil located in proximity to the first and second magnetometers, wherein (i) the network is coupled to the processor, (ii) the processor provides a voltage signal at the network for producing a first self-trimming current, and (iii) the coil generates a magnetic field in the vicinity of the first and second magnetometers when the first self trimming current passes through the coil.

25. The magnetic compass of claim 24, further comprising data storage for storing program instructions executable by the processor, wherein the program instructions include (i) one or more instructions for computing at least one calibration coefficient, and (ii) one or more instructions for applying the at least one calibration coefficient to trim at least one compass signal produced by the compass.

26. The magnetic compass of claim 24, further comprising:
a third magnetometer that (i) produces a third output signal, (ii) is coupled to the amplification means, and (iii) is located in proximity to the coil, wherein the amplification means receives and then amplifies the third output signal to produce a third amplifier signal, the analog-to-digital signal converting means receives and then converts the third amplifier signal to a third digital signal, and the processor receives the third digital signal; and
data storage for storing program instructions executable by the processor, wherein the program instructions include (i) one or more instructions for computing one or more calibration coefficients based on values of the first, second and third digital signals received at the processor when the first self-trimming current is passing through the coil and values of the first, second, and third digital signals received at the processor when the first self-trimming current is not passing through the coil, and (ii) one or more instructions for applying the one or more calibration coefficients to trim one or more compass signals produced by the compass.

27. In a magnetic compass that includes a processor, a coil coupled to the processor, at least first and second magnetometers, and an analog-to-digital signal converting means that converts at least a first analog signal produced by the first magnetometer to a first digital signal and a second analog signal produced by the second magnetometer to a second digital signal, a method of calibrating the magnetic compass comprising:
driving the coil with a first voltage supplied by a first processor output so as to supply a first self-trimming current through the coil;
reading values of the first and second digital signals, at the processor when driving the coil with the first voltage, to obtain a first digital value and a second digital value, respectively;
reading values of the first and second digital signals, at the processor when not driving the coil with the first voltage, to obtain a third digital value and a fourth digital value, respectively; and
determining a first calibration coefficient based on the first digital value, the second digital value, the third digital value, and the fourth digital value, for use in trimming at least one of the first and second digital signals.

28. The method of claim 27, wherein driving the coil with the first voltage to supply the first self-trimming current through the coil causes the coil to generate a first magnetic field in the vicinity of the first magnetometer and the second magnetometer, wherein the first magnetic field causes the first analog signal and the second analog signals to change in value.

29. The method of claim 27, wherein determining the first calibration coefficient involves the processor executing at least a first program instruction for determining a first calibration coefficient, wherein the at least a first program instruction includes an instruction to divide an absolute value of a difference between the first digital value and the third digital value by an absolute value of a difference between the second digital value and the fourth digital value.

30. The method of claim 29, further comprising adjusting at least one of the first and second digital signals, wherein adjusting the at least one of the first and second digital signals comprises the processor executing at least a second program instruction, wherein the at least a second program instruction includes an instruction to multiply at least one of the first and second digital signals by the first calibration coefficient.

31. The method of claim 30, further comprising verifying the step of determining the first calibration coefficient, wherein the verifying comprises:
driving the coil with a second voltage supplied by a second processor output so as to supply a second self-trimming current through the coil;
reading values of the first and second digital signals, at the processor when driving the coil with the second voltage, to obtain a fifth digital value and a sixth digital value, respectively;
determining a second calibration coefficient based on the first digital value, the second digital value, the fifth digital value, and the sixth digital value; and
comparing the first calibration coefficient to the second calibration coefficient.

32. The method of claim 31, wherein determining the second calibration coefficient involves the processor executing at least a third program instruction for determining the second calibration coefficient, wherein the at least a third program instruction includes an instruction to divide an absolute value of a difference between the first digital value and the fifth digital value by an absolute value of a difference between the second digital value and the sixth digital value.

33. The method of claim 31, wherein driving the coil with the second voltage to supply the second self-trimming current through the coil causes the coil to generate a second magnetic field in the vicinity of the first magnetometer and the second magnetometer, wherein the second magnetic field causes the first analog signal and the second analog signal to change in value.

34. The method of claim 27, further comprising supplying the first analog signal from the first magnetometer and the second analog signal from the second magnetometer, to an amplification means for amplification of the first analog signal and the second analog signal prior to supplying the first analog signal and the second analog signal to the analog-to-digital signal converting means.

* * * * *